United States Patent [19]
Thuresson et al.

[11] Patent Number: 5,815,556
[45] Date of Patent: *Sep. 29, 1998

[54] METHOD AND APPARATUS FOR EXTRACTING A SUBSET OF DATA WANTED BY A CUSTOMER FROM A GROUP OF SUBSETS OF DATA WANTED BY DIFFERENT CUSTOMERS

[75] Inventors: Erik M. Thuresson, Saltsjöbaden; A. Karolina Philippi, Stenhamra; E. Andreas Bartsch; Carina M. Runefjord, both of Stockholm, all of Sweden

[73] Assignee: Telefonaktiebolaget L M Ericsson, Sweden

[*] Notice: This patent issued on a continued prosecution application filed under 37 CFR 1.53(d), and is subject to the twenty year patent term provisions of 35 U.S.C. 154(a)(2).

[21] Appl. No.: 352,853

[22] Filed: Dec. 2, 1994

[30] Foreign Application Priority Data

Dec. 3, 1993 [SE] Sweden .................................. 9304026

[51] Int. Cl.⁶ .................................................. H04M 11/00
[52] U.S. Cl. .................................. 379/93.25; 379/100.05; 379/133; 707/10; 707/103; 707/104
[58] Field of Search ....................... 395/600; 364/DIG. 1; 707/103, 10, 104; 379/93.25, 100.05, 133

[56] References Cited

U.S. PATENT DOCUMENTS

| | | | |
|---|---|---|---|
| 4,745,559 | 5/1988 | Willis et al. .............................. | 364/514 |
| 5,333,183 | 7/1994 | Herbert ................................... | 379/112 |
| 5,446,886 | 8/1995 | Li .......................................... | 395/600 |
| 5,504,890 | 4/1996 | Sanford ................................... | 395/600 |
| 5,515,531 | 5/1996 | Fujiwara et al. ......................... | 395/600 |
| 5,537,586 | 7/1996 | Amram et al. ........................... | 395/600 |
| 5,546,455 | 8/1996 | Joyce et al. .............................. | 379/265 |
| 5,548,792 | 8/1996 | Babonneau .............................. | 395/859 |
| 5,560,006 | 9/1996 | Layden et al. ........................... | 395/600 |
| 5,570,417 | 10/1996 | Byers ..................................... | 379/115 |
| 5,590,181 | 12/1996 | Hogan et al. ............................ | 379/114 |
| 5,646,839 | 7/1997 | Katz ....................................... | 379/93.01 |
| 5,655,013 | 8/1997 | Gainsboro ............................... | 379/188 |

FOREIGN PATENT DOCUMENTS 2 191 069  2/1987  United Kingdom .
92/21091  11/1992  WIPO .

*Primary Examiner*—Wayne Amsbury
*Assistant Examiner*—Jean R. Homere
*Attorney, Agent, or Firm*—Burns, Doane, Swecker & Mathis, L.L.P.

[57] ABSTRACT

An electronic, computer based telecommunication system has an object oriented processor system with the aid of which data are exchanged between data bases and customers connected thereto. A data record is created from a selected memory in which all the information from for example a telephone call is stored, this record being common to all customers. The record comprises only that information which is required by the customers. From this data record then the specific data which are desired by an individual customer are extracted. Three kinds of objects are defined and stored in corresponding memories, service templates, customer templates and an output type. The first objects define the types of service which is used. In a second object the information is defined which a customer wants to extract from the common data record. Thus each customer has its own customer template. In the third object, the output type a union is created, based on the information in the other objects, the service templates and customer templates, the union being used for pointing to that information from the memory, which forms the common data record. Identical copies of the common data record are stored in memories specific for each customer for extraction by postprocessing units.

40 Claims, 5 Drawing Sheets

METHOD AND APPARATUS FOR EXTRACTING A SUBSET OF DATA WANTED BY A CUSTOMER FROM A GROUP OF SUBSETS OF DATA WANTED BY DIFFERENT CUSTOMERS

BACKGROUND

The invention relates to a method and a device in a data base or data handling system, in particular in an electronic computer based telecommunication system in which data is exchanged between data bases and customers connected thereto, for determining those data which are to be extracted from a group of data considering requirements from many connected, different customers.

This application claims priority from Swedish Patent Application No. 9304026-9, filed Dec. 3, 1993, which is expressly incorporated here by reference.

In British Patent Application GB 2 191 069 for Reuters Limited a method is described for accessing data according to which method, in a receiver, local templates are defined for exchanging parts of data record from a common issued data stream of updatable data records. Selected data records are used to create reconstituted data records differing from transmitted data records. A common defined local template can be used for a multitude of different data records having a common set of information categories.

U.S. Pat. No. 4,745,559 to Willis et al. describes a method and a system for dynamical control of the contents of a local receiver data base from a transmitter data base. The messages from the transmitter data base are used for increasing and decreasing repeatedly the contents of the local data base on a record-by-record basis. Storage templates are stored with access possibility in the local receiver data base. These storage templates are locally retrievable based on the reception of a unique identifier. Each stored data record has a unique associated storage template, even if a storage template can have a correspondence to a multitude of different data records. In cooperation with transmitted update messages the required communication capacity is reduced.

SUMMARY

The problem which is not solved by the prior art is as follows. In an information system different types of objects can be distinguished, which each one is identifiable by an identifier. Each object can comprise different kinds of data information. The different data objects are collected in a common object or collection object. There are many different customers which need the data information thus collected. Each one of the customers has, however, not the need for the same data. The data which are required by the customers are to be extracted from the data collected in the common object and stored in a data record. This data record is in turn stored in a memory (Log) owned by the customer. The data record does not contain all the data which are comprised in the common data object. The problem is that it is not possible to create a separate data record for each customer since it would require a too great computer capacity to transfer all these data records to the different customers. A further problem is determining that data information which is needed by each one of the customers and how such a data record is to be created which contains all the data which is needed by each one of the customers.

It is an object of the invention to provide a method and a device allowing a good utilization of the information communication capacity in database systems where information of different kinds is distributed to various places or customers having individual requirements.

It is another object of the invention to provide a method and a device allowing customers connected to a data base to have data delivered from one of a number of allowed data sets, the allowed data sets being defined in a versatile way.

The problem mentioned above is solved by the invention and the object of the invention is achieved by providing a method and a device, the characteristics of which are set out below.

Thus in a first step, three objects are defined which each one is stored in a data base. The different objects consist of memory means, each one containing a number of data fields or attributes. The data base is a single one but may be distributed in a system. A group or collection of data generated from a telephone call is handled for creating a data record or data file which is used for for instance call debiting. The method and the device are naturally applicable to arbitrary types of data which are collected in groups.

In a telecommunication system a large number of different services are used. Each service generates different types of data. A first object, service template, is defined in which the constructor of the service is to specify identifiers for the data included in the service.

An application programmer specifies different types of a second object, output type. One or several service templates are connected to an output type. The service templates connected to an output type indicate the data which are included in said output type.

When a customer wants to determine the data which are to be extracted by an output type, the customer must specify a third object, customer template. In the customer template the customer specifies the identifiers for the data which are to be extracted for the output type. It is only possible to choose such identifiers which are included in the service templates associated with the respective output type. When a customer template has been created, updated or erased the associated output type reads all associated customer templates and corrects all different specifications or indications to a union. This union constitutes a definition of the data which are to be extracted from the group or collection of data. The definition makes it possible to create a common data record satisfying the requirements of all the customers.

In the method disclosed in the cited British Patent Application GB 2 191 069 common data are issued to several users. Locally, data can then be selected according to locally defined templates. Thus several locally defined templates are not used, as discussed above, to form a union constituting the definition of the data which are to be extracted in order to generate a single data record satisfying the requirements of all customers.

Also, the cited U.S. Pat. No. 4,745,559 discloses that common data are issued to several users after which data are selected according to locally defined templates. A union, as discussed above, is thus not formed of several locally established templates constituting the definition of the data which are to be extracted to create a single data record satisfying the requirements of all customers.

Thus, generally, desired data are extracted in a data base or data handling or processing system such as a telephone network, where sets of data for repeated transactions are generated, the transactions then for instance being telephone calls. The sets of data can also be generated outside the system to be processed by it and retrieved by customers. Data are various kinds of values, addresses, names etc. Customers which are connected to the system may then want different subsets of the generated data, that is specified selected information. When a set of data is generated, only those data are centrally extracted which belong to at least one of the subsets of data wanted by the customers. All these extracted data are stored as identical copies in a separate memory area arranged for each customer. The set of data wanted by a customer can then be extracted from its or his memory area.

A common template may be centrally created comprising a union of definitions of the sets of data wanted by the customers. Each customer may also have an own template defining the wanted data.

In particular, the extraction process may be carried out in an electronic, computer based telecommunication system using an object oriented processor system by means of which data are exchanged between data bases and customers connected thereto. Thus also here, for extracting exactly that specific information which an individual customer wants to have delivered a data record is commonly created for the customers. This data record is created from information stored in data storing means intended for one of a number of particular services and comprising all information for the service. The data record, which is common to all connected customers, is arranged to contain only the information which is needed by the customers. To each one of the customers exactly those data which are based on the desires of the individual customer can be extracted from the common data record.

An customer object is arranged for each customer, the object comprising a template and defining the data information which the customer wants to extract from the common data record. A common or central object is arranged, which is associated with customer objects and is based on information therein, for creating a definition of the common data record by uniting only the definitions in all associated customer objects to a union. This union then is the definition of the data which are extracted from the data storing means for creating the common data record.

A common data record may be stored as an identical copy in a separate memory means connected or connectable individually to each one of the customers. Such a common data record which is stored in one of the separate memory means can then be processed, as requested by a customer, to extract and deliver from this separately stored common data record exactly the particular information which the connected customer wants to have delivered as defined in his or its customer object.

There may be a further object associated with the common object and preferably there are several such further objects. Such a further object defines the data information which is included in a service. It may then comprise a data field comprising a set of identifiers of the data included in the service.

A customer object can comprise a data field comprising identifiers for the data information which a customer wants to extract from the set of data. The common object can comprise a data field comprising the union.

Also, each customer connected to the system may be allowed to have data delivered only from specific subsets of the generated data, the customer then selecting his or its desired data from one of these specific subsets. Then, from each generated set of data predefined subsets thereof are generated and these predefined subsets are members of predefined groups. A customer is allowed to choose its or his wanted subset of data from the data comprised in the predefined subsets which are members in a group.

The generated sets of data can then be stored according to templates which are individual to each predefined subset. A template defines the data which the subset contains. The data of a predefined subset or pointers to those data can advantageously be stored in an individual data storing means for each such subset.

A union template can be created for each group of subsets, the union template then being a union of the definitions in the templates of the subsets in the group.

Specifically, in an electronic, computer based telecommunication system as above comprising an object oriented processor system the predefined subsets can each one belong to one of a number of particular services and then comprise all the information which is related to the service.

Service objects are advantageously arranged, each one defining or comprising a service template for the data information which is included in a service. A common object can then be arranged, which is associated with at least two service objects and comprises definitions based on information in these service objects, to create a definition of the possible data which can be allowed to be delivered to a customer, by uniting only the definitions in all the associated service objects to a union.

The corresponding system then generally comprises a separate memory area arranged for each customer. Further, there are first extraction means for extracting, when a set of data is generated, only those data which belong to at least one of the subsets of data wanted by the customers, and for storing all these extracted data in each separate memory area arranged for the customers. Second extraction means are arranged for extracting from such a memory area for a customer only those data belonging to the subset of data wanted by the customer.

The first extraction means can comprise memory means for storing a common template comprising a union of only definitions of the sets of data wanted by the customers. In the same way the second extraction means can comprise memory means for storing a template for defining the set of data wanted by customer.

As applied in an electronic, computer based telecommunication system like above comprising an object oriented processor system, there may, as has already been mentioned, be arranged a data storing means which is intended for one of a number of particular services and contains all the information related to the service. The data storing means then comprises a memory in which all the data related to the particular service are continuously stored and read. The first extraction means can create one data record from the information stored in the data storing means, the data record being common to all connected customers and containing only the information which is needed by the customers. The second extraction means are then arranged, so that exactly those data which are based on the desires of the respective customer is extracted from the common data record to each one of the customers.

A first unit can be arranged comprising a first memory area for storing a first object or service object comprising information defining a service. The first unit can further comprise second memory areas, one for each customer and for storing a second object or customer object which is associated with the customer and comprises definitions of the data which the respective customer wants to extract from the common data record. The first unit can, in addition, comprise a third memory area for storing a third object or common object, associated with the first and second memory areas.

A second unit may be arranged to, during current handling of the service, write data necessary to the service in the data storing means and, after finished handling of the service, to provide to the first unit a packing command signal. The first unit can then, when receiving the signal, use the definitions in the third common object associated with the service for forming the common data record.

The third or common object, also called output type, is arranged to, when one of the second or customer objects associated therewith is changed, read all the second or customer objects associated with the third object, and to form a union of the definitions of data as specified in these second objects.

Separate memory means for each customer may be included in the second extraction means. Distribution means can then forward a copy of the common data record to each one of separate memory means belonging to the respective customer. A data processing unit is arranged which is individually connectable to each customer and also is included in the second extraction means. The separate memory means for a customer are then arranged, on receiving a signal issued by the customer requesting to have his or its individual data delivered, to copy or deliver the whole current data record stored therein to the data processing unit. The data processing unit will then, after a comparison between the information in the received common data record and the information in the second or customer object belonging to the customer, deliver the desired individual information to the customer.

A data processing unit can comprise a register and a comparator circuit. The unit is arranged, at a signal issued when a customer, with which the data processing unit is connectable, wants to have data delivered, to activate the comparator circuit for comparing the information as provided from the separate memory means belonging to the customer and the definitions in second object of this customer and to store, depending on the result of the comparison, the corresponding data in the register and to deliver the data to the customer from the register.

The telecommunication system is in particular a telephone system by means of which connected subscribers exchange telephone calls, the data generated then being all the information which is related to the calls and being stored in the data storing means intended therefore. Data included in a service, which are stored in the data storing means, in particular for the service debiting, comprise debiting data generated during a telephone call, such data in particular comprising telephone numbers of the called and the calling telephone set or extension, start time of the call, end time, duration, debitable time, date, etc.

A separate data storing means can be arranged for each particular service, the means comprising subsets of generated data or pointers to such data.

The separate storing means are preferably arranged to store a number of different common data records common to the customers, in particular one common data record per each telephone call made in the telecommunication system.

According to another aspect there are generally in the system extraction means for extracting from each generated set of data predefined subsets thereof, these subsets corresponding to different services. The data of each extracted subset or pointers to those data are stored in data storage means, where one separate or individual data storage means is arranged for each extracted subset of data. Predefined groups of such subsets extracted from one generated set of data are also arranged and a customer is allowed to choose his or its wanted subset of data from the data comprised in the subsets in one of the groups.

Then memory means may be arranged for storing templates individual to each predefined subset, the templates defining the data which the subset contains. The data of a predefined subset or pointers to those data can be stored in an individual data storing means for each such subset.

Memory means can also be arranged for storing a union template for each group of subsets, the union template then being a union of the definitions in the templates of the subsets in the group.

In an electronic, computer based telecommunication system comprising an object oriented processor system like above, the predefined subsets can each one belong to one of a number of particular services, as stated above, and each one then comprises all information, which is related to the service. Memory means are arranged for storing service objects, which each one defines the data information which is included in a service. Memory means are also arranged for storing a common object, which is associated with service objects and comprises definitions based on information in these service objects, the common object comprising a definition of the possible data which can be allowed to be delivered to a customer and being created by uniting only the definitions in all associated service objects to a union.

BRIEF DESCRIPTION OF THE DRAWINGS

The invention will be described in more detail hereinafter as nonlimiting examples with reference to the accompanying drawings in which.

DETAILED DESCRIPTION

The method and the device of the invention will be described as applied in an electronic computer based telecommunication system comprising an object oriented processor system containing a controller unit, primary/secondary memories and software necessary for information interchange. The system is based on programming in different handling cases. Data information is exchanged between data bases and customers connected thereto in order to determine the data which are to be extracted from a group of data considering requirements from many connected different customers.

Figure 1:
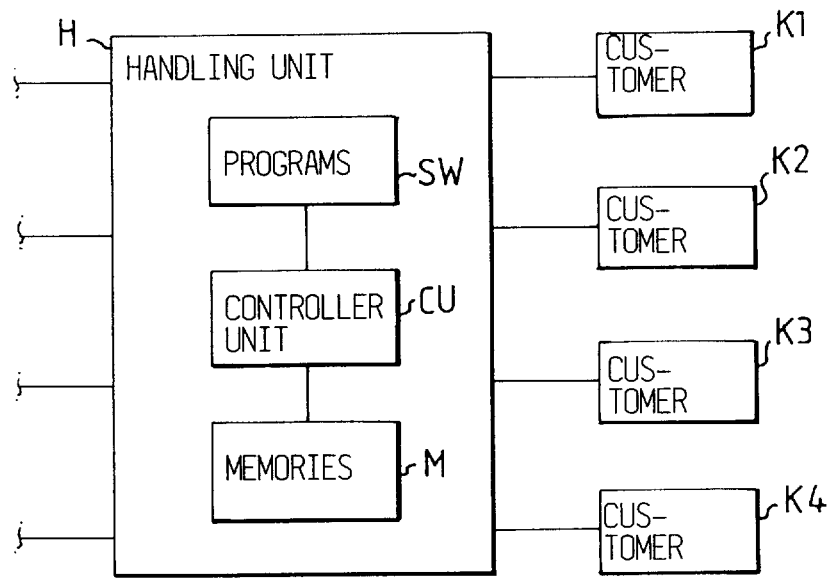
FIG. 1 in a block diagram shows a handler in a telecommunication network to which a number of customers are connected.

As appears from FIG. 1, a number of customers, e.g. K1–K4, can request data from a common data record created for the purpose and stored in a memory area M, in which data record all the data are collected which all of the customers need. The different customers can have completely different desires in regard of the data information which they want to extract. The creation of the common data record and the extraction of the individual customer data will be described hereinafter. It is seen in FIG. 1 how a handling unit H in said processor system is in contact with a number of customers K1–K4. The handling unit contains the memories M, the controller unit CU and the software SW mentioned above. The controller unit CU controls reading and writing in the memories and activates the programs, as conventionally controlled by a clock, not shown.

The telecommunication system may in particular be a digital telephone system in which a number of customers use the multitude of services which can be offered by such a system. An example of such a service is the service debiting which is the special service which will be discussed in some detail below. Customers are then institutions or persons which themselves have a responsibility for a number of own subscribers, e.g. different administrations, authorities, hotels, hospitals etc. and thus they have a need of debiting services. The method and device described here can be used for information communication in a number of applications but specifically the method and the device are related to a telephone system in which telephone calls are interchanged between subscribers connected to the system.

Figure 2:
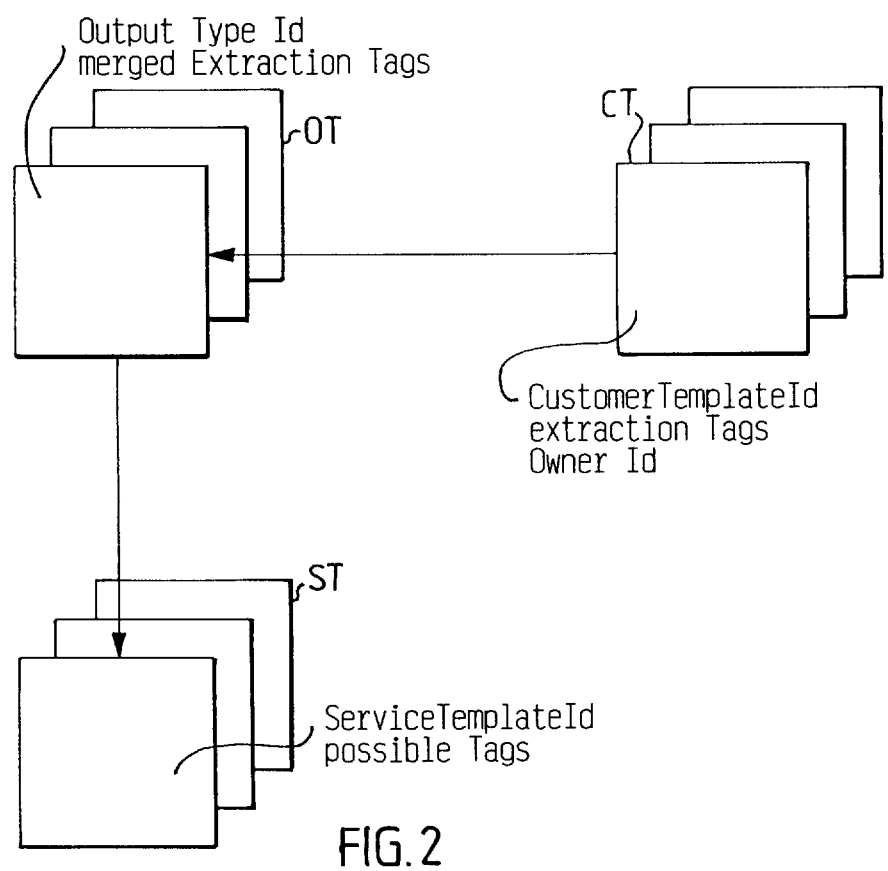
FIG. 2 shows in the shape of blocks the connection between objects service template ST, customer template CT and output type OT, FIG. 3 schematically shows the updating procedure of an output type OT.

As illustrated in FIG. 2, three objects are used, service template ST, output type OT and customer template CT.

An object can for instance be constituted by lists of fields and their relations to each other and to other objects, and it is stored in memory means which thus can hold data information of a specified format divided in different data fields or attributes, comprising different types of identifying information, the identifiers being used for pointing to information stored in the primary/secondary memories.

The object service template ST is an object determining the information which is comprised in a service. The incorporated data field or attribute ServiceTemplateId comprises the identifier of the object. The further attribute "possible Tags" comprises a set of identifiers of the data which are included in the service.

The object output type OT is constituted by attributes and transactions for creating, based on requirements of customers associated with the output type, a union common thereto of data constituting the definition of the data which are to be extracted later from said group of data. The data field OutputTypeId comprises the identifier of the object. The data field called "merged Extraction Tags" contains the union or collection of all the different specifications in all objects customer template CT associated with the object output type OT. The object output type OT is related with zero in relation to many objects of type service template ST and customer template CT what for instance means that if there is no object service template the relation is 0 (zero). The relation can be 0, 1, to many, so called cardinality.

The object customer template CT contains the different customer requirements and is stored in memory areas in which the information is entered which is specified by a customer having a customer template CT. The data field CustomerTemplateId comprises the identifier of the object. The data field ownerId comprises the identification of the object owner, that is of the customer. The data field called "extraction Tags" comprises the identifiers for the data information which the customer wants to extract from the set of data related to the associated object output type OT.

A customer template CT is always related to one output type OT. The output type OT determines through its associated service templates ST the identifiers for the data objects or services which can be chosen. A number of service templates ST can be assigned to each output type OT. If the respective output type OT is connected to a service template ST which for instance contains the identifiers 1, 6, 8 and 10 and another service template ST containing the identifiers 1, 5 and 20, a customer template CT must choose among the union of these identifiers, that is among 1, 5, 6, 8, 10 and 20.

Figure 3:
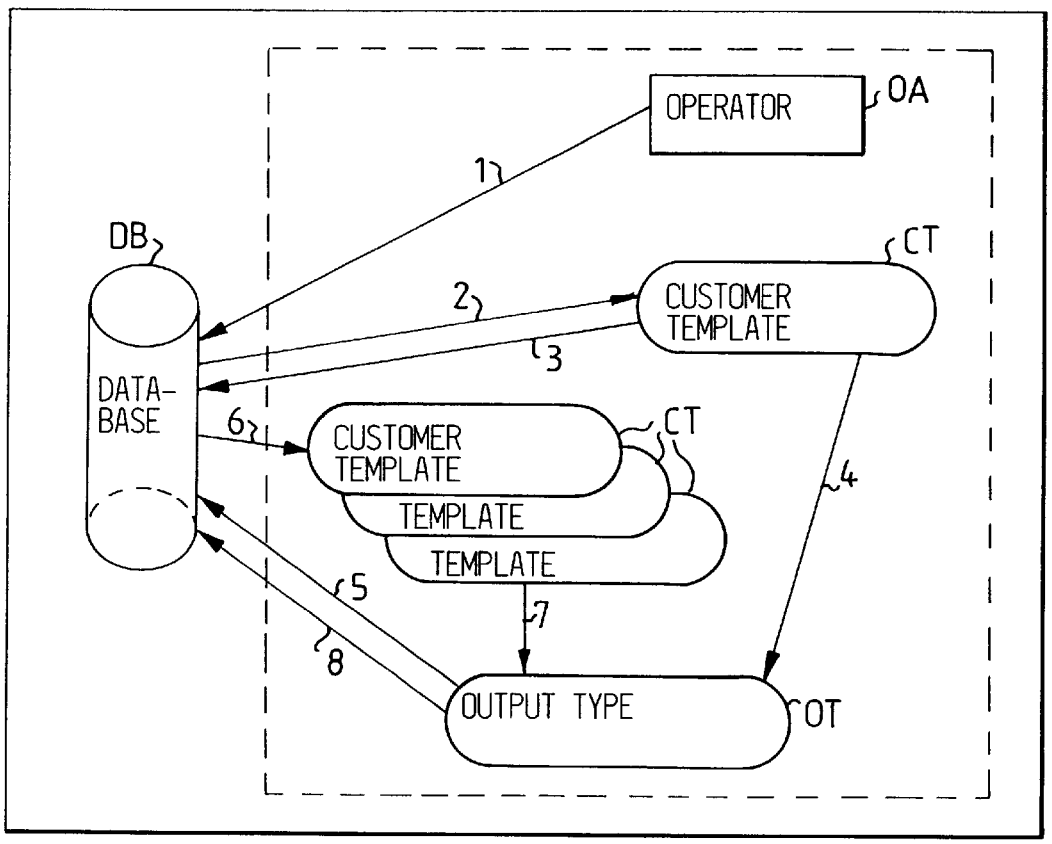

In FIG. 3 updating of the object output type OT is illustrated. The Figure shows the connection between operator OA, data base DB, customer template CT, output type OT. Each update of a customer template CT results in an update of the corresponding output type OT. When an update of a customer template CT is demanded, the operator OA issues a demand 1 of opening the respective template to the data base DB, which then issues a signal 2 which opens this customer template CT. The operator OA specifies which data are to be extracted from the common data set and the new contents of the customer template CT are stored 3 in the data base DB. From the customer template CT an update 4 is commanded or triggered of the associated output type OT, by e.g. a pointer in the customer template CT indicating that when an update is made, a suitable signal will be issued, or by pointing to a software routine issuing such a signal to the output type OT. The object output type OT then sends a request 5 to the data base DB to open all other customer templates CT, which are associated with the same output type. The data base DB responds issuing signals 6 opening all the customer templates CT associated with the object. The data fields "extraction Tags" in the customer templates CT are united to a union and are stored 7 in the field "merged Extraction Tags" in the output type OT. The output type OT thus updated is stored 8 in the data base DB, the update or change only being made in the attribute "merged Extraction Tags".

Figure 4:
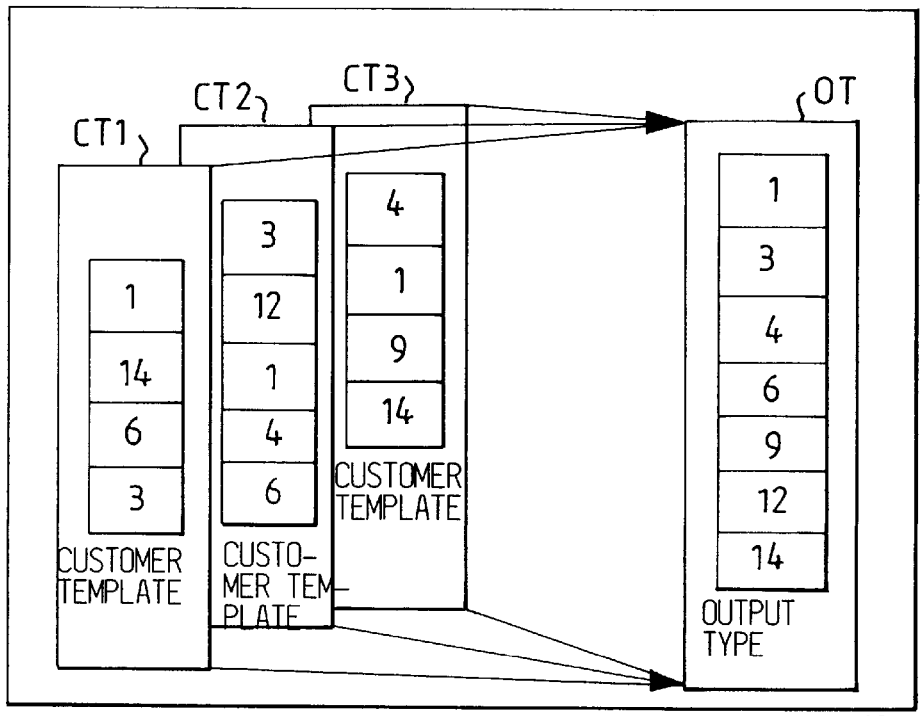
FIG. 4 illustrates schematically the forming of a union of customer data.

Thus, when a customer template CT has been updated the associated output type OT is notified which then reads the data of all the associated customer templates CT1, CT2, CT3, as illustrated in FIG. 4. The data field "extraction Tags" in each customer template CT1, CT2, CT3 are united in the data field "merged Extraction Tags" in the output type OT. This data field then contains a union of that data information which is required by all the customers, and this information can then be extracted from a group of data as specified by the output type OT. For carrying out this procedure, the output type OT may e.g. contain a pointer to a suitable program to be executed when the above signal is received.

The only object or means which is necessary in extraction of data from a group of data is an output type OT which thus contains a list of the data, for instance some suitable identifiers or pointers. The output type OT can also receive a signal for extracting data from a specified group of data and to write the data to a specified data area. The output type OT then accesses the identifiers in its data field "merged Extraction Tags" and forwards them to another part of the system where the data are extracted or retrieved from the group of data. Since the data field "merged Extraction Tags" contains the collection or union of all customer data requirements the file thus created satisfies the condition of providing only one file or data record for the needs of all the customers. This method of collecting data saves much processor capacity and makes the system more rapid than if it had been necessary to create one individual data record for each customer.

During a telephone call, then, data for the call are collected in a collection object, which can comprise a list pointing to other objects, for example the telephone number of the called telephone extension or set, duration, i.e. different types of information associated with the call. All the objects, i.e. service template ST, customer template CT, output type OT, etc. an be lists of pointers to different memory areas, conditions etc.

Figure 5:
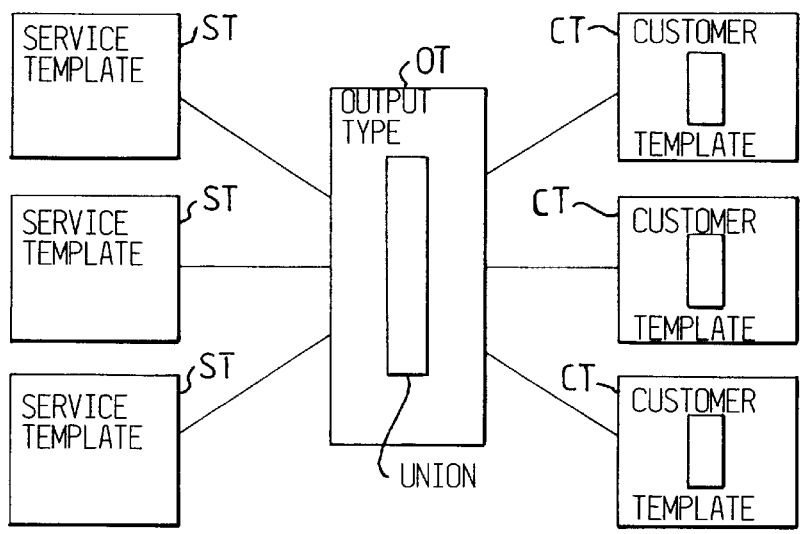
FIG. 5 illustrates in a block diagram further the connection between the objects ST, CT and OT.

The output types OT differ from each other depending on the services which are included what in turn is determined by the number of associated service templates ST. In FIG. 5 the relation is shown between an output type OT and service templates ST and customer templates CT associated therewith where the service templates ST as has been mentioned earlier define the service and the customer templates CT define the data which the respective customer desires to have delivered. The output type OT is coupled to routines for reading information both in the service templates ST and in the customer templates CT. In FIG. 5 further, the union is indicated which has been formed by uniting the definitions in the respective service template CT.

Below is given a schematic example of the course of events in a system which carries out the general method described above. Customers can in this case be administrations etc. having a responsibility of own subscribers. The description does not everywhere use explicitly the objects as discussed above.

Figure 6:
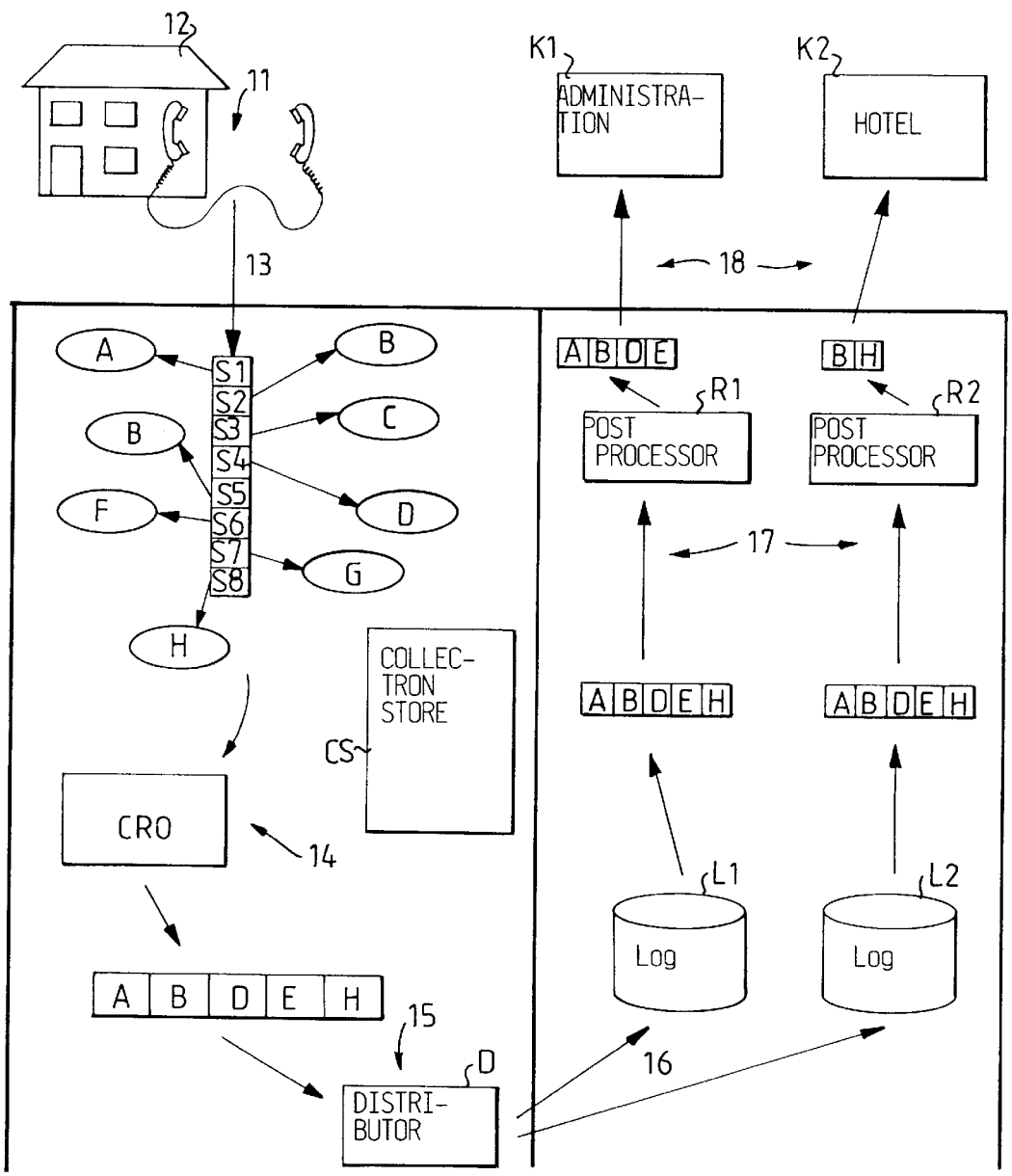
FIG. 6 is a schematic description of a procedure for call debiting.

Thus, in FIG. 6 an example is illustrated where as indicated at 11 a telephone call is exchanged from telephone set or extension in a hotel 12 to a place outside it. When the call is to be debited, the administration of the telephone network, the telephone office, symbolically designated by the box K1, wants to debit the management of the hotel 12, symbolically designated by the box K2, and the hotel management K2 wants to debit the guest which has made the call. It means that two parts or customers K1, K2 are interested in obtaining debiting data from the telephone call.

As is indicated at 13 in the Figure, during the course of the call, various types of call data A–H are generated in steps S1–S8, the data for example indicating how long time the call lasts, the telephone number to which the call is, etc. This information is collected in a collection store or collection memory CS.

After the call the system is to pack, by means of a unit Call Record Output CRO, indicated by the box 14, the generated call information to a call record. CRO then uses all the templates which the customers, i.e. the administration, the hotel, have created in which they indicate the information which they want from the call. The administration for instance requests to have data A, B, D, E and the hotel management requests data B and H. In order to pack only one call record per call, the requests of all of the customers are collected and the call record is packed according to the unified request. As indicated at 15 the call record thus packed is sent to a distribution means D which in turn forwards it for storage in logs or memories L1, L2, each one corresponding to a separate customer K1, K2.

As indicated at 16 the distribution means D transmits two identical call records, one to each one of the two customers, the administration and the hotel K1, K2. The records are stored, as has been mentioned above, for or with the respective customer in a log or memory L1, L2 owned by the customer K1, K2 respectively. In these memories L1, L2 the information is saved until a request of having it delivered is made.

When the administration or the hotel K1 or K2, wants to have the debiting data delivered, the call records are forwarded to postprocessing in a data processing unit R1, R2 respectively, as indicated at 17. There the information is removed which is not requested by the respective customer.

As indicated at 18, the requested call record is then delivered to the respective customer K1, K2.

Figure 7:
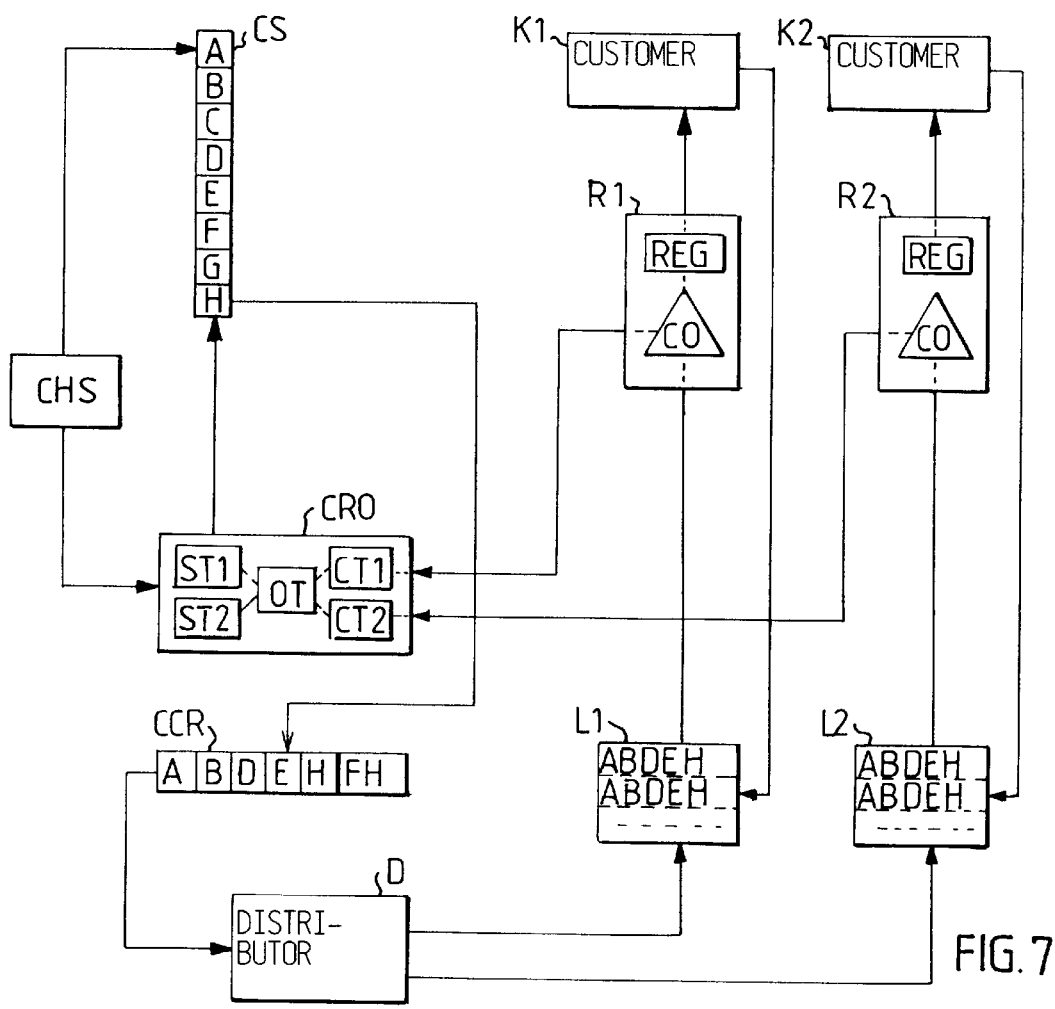
FIG. 7 shows in a block diagram the procedure of FIG. 6.

The same procedure is illustrated in FIG. 7 in a little other way. The collection store CS can be a memory area in which all of the generated data, from for example a telephone call, is stored in a binary form. The memory CS can be a part of the primary memory in the main computer of the system. Different types of collection stores exist which may be chosen depending on the application.

The block Call Record Output CRO is a unit for packing information as has been mentioned with reference to FIG. 6 and comprises the objects output type OT, service template ST and customer template CT. Each one of these objects can occur in CRO in a number larger than one.

A block Charging Support CHS comprises functions for general taxing services corresponding to the steps S1–S8 in FIG. 6. By establishing a telephone connection, the debiting service is called, that is predetermined information written in the computer of the system is transferred to the block Charging Support CHS, the task of which is to point to one of a number collection stores CS intended for different services, in this case a memory area in which data from a telephone call are stored. Commanded from the operative system of the system Charging Support CHS writes, during the course of the call, for instance start time, date, end time, duration, debitable time, telephone number of the subscriber, etc. in the memory CS. By a signal to the block Call Record Output CRO the block Charging Support CHS in addition gives, after the end of the call, an order to an output type OT to collect or pack data which are present in the memory CS to be forwarded in the system. For longer calls such a command can also be issued during the course of the call. The output type OT contains the information defining the data information in the memory CS which is to be packed.

Figure 8:
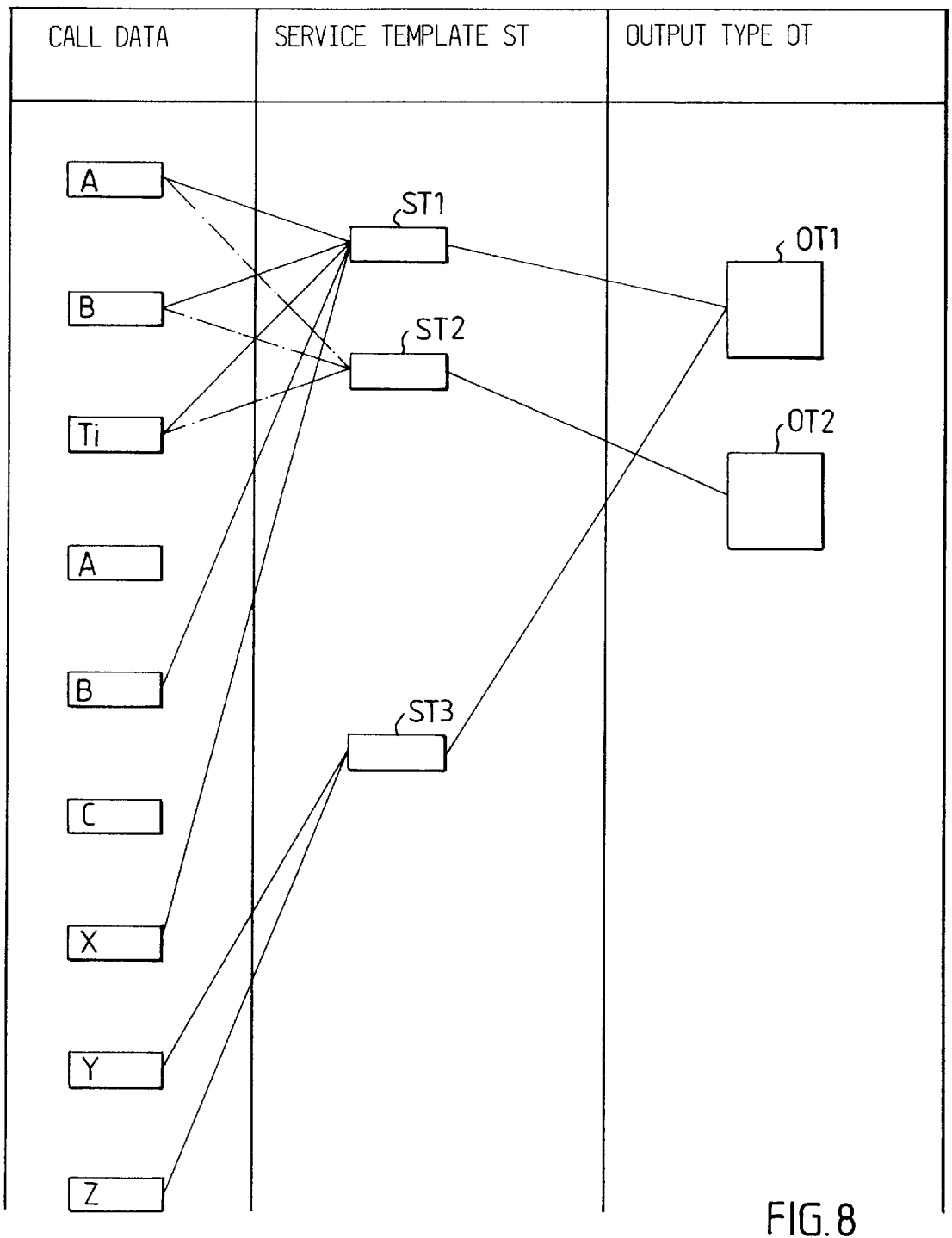
FIG. 8 shows the connection between different types of output types OT and the number of service templates ST.

An output type OT can be more or less advanced depending on the services which it comprises. There are thus possibilities for the customer to choose, depending on his need, a more or less advanced OT. As is illustrated in FIG. 8, a customer chooses an output type OT and then receives such an OT which contains the services which are wanted by the customer. The extraction definitions of different output types OT are composed by information of the possible data fields which exists in the objects service template ST. The output type OT gets information from associated service templates ST to form the possible data fields which may be requested by a customer. By means of these service templates ST and customer templates CT associated with it an output type OT knows which information is to be packed from the call, depending on the desires of different customers. The service templates ST define different types of services but each one is not especially intended for for example debiting. An ST can for instance, beside debiting data, also define data for other services. For a complete service the output type OT therefore chooses among several service templates ST. The output type OT determines the service which is to be extracted from the different service templates ST attached thereto, based on information from customer templates CT. The output type OT defines the desires of the different customers for data to be delivered. The output type OT thus knows the data which are to be packed and also performs the very packing after initiation from the block Charging Support CHS, as indicated in FIG. 7. Packing is made after pointing from the output type OT to definite addresses in the memory CS. According to the example an output type OT can, from a main service, for instance debiting data, point to eight partial services or data A–H from the memory CS, but the information in the customer templates CT limits the number to five, for example ABDEH, since the present customers, i.e. the administration K1 and the hotel K2, have not requested any other partial services. The partial services can, as has been mentioned earlier, for instance consist of the telephone number of the subscriber, duration, debitable time, etc. The data, thus specified, and packed by the output type OT are pointed to and read from the memory CS and stored in a new data area called Charging Call Record CCR. The information in the memory CS which the output type OT has not specified is thus not entered in the Charging Call Record CCR.

By writing in a common memory area, defined or pointed to in the output type OT, the data from all the customer templates CT associated with the output type OT, a union is formed of data desired by all the customers. By means of this union the output type OT points to the data fields from the memory CS which are to be written in the memory area labelled Charging Call Record CCR.

The information in the memory area Charging Call Record CCR is constituted by the data which form a basis of the debiting and it is preceded by a format header FH. This information is the data record which is common to the customers as has been discussed above.

The information in the memory area Charging Call Record CCR is read by the distribution unit D which interprets the contents of the header FH in the information stream. From the interpretation the distribution unit D knows the addresses to which the information is to be forwarded. The information which in this case consists of the packed information read from the memory CS by the output type OT and corresponds to the common desires of the customers, is forwarded to each one of the customers K1, K2 in the form of exactly identical information packages by means of the distribution unit D.

Each one of the customers, administration K1 and hotel K2, has its own memory L1, L2, in which the packed information from the memory Charging Call Record CCR is written. The memories L1, L2, also called logs, are parts of the secondary memory of the system and have each one a capacity of storing information from a multitude of memory areas Charging Call Record CCR, one CCR per call. When one of the customers, for instance K1, the administration, wants to have debiting information delivered, an order is issued from the customer in the form of a signal to the log of the customer, in this case L1, commanding reading the information from a specified memory Charging Call Record CCR therein. The information thus read from the log L1 is forwarded to a data processing unit R1 for further processing. Each customer has such an individually connected processing unit.

The unit R1 contains a register REG and a comparator CO for further processing of the information from the log L1. As has been mentioned earlier, this information contains a union of the data of all customers. The task of the unit R1 is therefore to extract, from this common data stream, exactly the specific information which the connected customer K1 has requested to get delivered. Data from the memory L1 is entered in the unit R1 in which a comparison is made to information from the own customer template CT of the customer K1. The customer template information is read from the present customer template CT as stored in the block Call Record Output CRO. After the comparison in the comparator CO the information which has been specifically demanded by the customer and defined in its customer template CT is delivered from the register REG, which means that all other information, which is not specified, is removed. Of the information ABDEH stored in the logs L1 and L2 of the customers K1, K2, only ABDE is delivered to the customer K1, the administration, and in the corresponding way only BH is delivered to the customer K2, the hotel, what thus is completely is in agreement with the desire of the respective customer.

Reading and writing in memories are performed in the conventional manner controlled by clocks and counters included in the system and are therefore not described in more detail.

It is obvious for one skilled in the art that the method and the device according to the invention is not limited to the handling of call debiting data but also can be used completely generally in connection with the transfer of data where a specification and sorting out of information is required.

What is claimed is:

1. A method for extracting desired data in a data handling system where sets of data for repeated transactions are generated and different customers connected to the system want different subsets of the generated data, comprising the steps of: when data is generated, extracting only those data which belong to at least one of the subsets of data wanted by the different customers and storing the extracted data in a separate memory area arranged for each customer, the subset of data wanted by a customer then being extracted from this memory area.

2. The method of claim 1, wherein a common template is created comprising a union of the subsets of data wanted by the customers.

3. The method of claim 1, wherein for specifying the subset of data wanted by customer a template is created defining the wanted data.

4. The method of claim 1, applied in an electronic, computer based telecommunication system comprising an object oriented processor system by which data are exchanged between data bases and customers connected thereto, for extracting, from a data record commonly created for the customers, exactly that specific information which an individual customer wants to have delivered, for creating, from information stored in data storing means intended for one of a number of particular services and comprising all information for the service, one data record, common to all connected customers containing only the information which is needed by the customers and to make it possible for each one of the customers to extract from the common data record exactly those data which are based on the desires of the individual customer, the method comprising the steps of:

arranging a customer object for each customer, the customer object defining the data information which the customer wants to extract from the common data record, and arranging a common object, which is associated with the customer objects and is based on information therein, to create a definition of the common data record by uniting only definitions in all associated customer objects to a union, which is the definition of the data which are extracted from the data storing means for creating the common data record.

5. The method of claim 4, wherein the common data record is stored in a separate memory means connected individually to each one of the customers, a common data record which is stored in a separate memory means being processed, as demanded by a customer, to extract and deliver from the separately stored common data record exactly the particular information which the connected customer wants to have delivered as defined in its customer object.

6. The method of claim 4, further comprising the step of arranging a service object associated with the common object and defining the data information which is included in a service.

7. The method of claim 6, wherein a service object comprises a data field comprising a set of identifiers of the data included in the service.

8. The method of claim 4, wherein a customer object comprises a data field comprising identifiers for the data information which a customer wants to extract from the set of data.

9. The method of claim 4, wherein the common object comprises a data field comprising the union.

10. A method for extracting desired data in a data handling system where sets of data for repeated transactions are generated and different customers connected to the system are allowed to have delivered different subsets of the generated data, comprising the steps of extracting from each generated set of data predefined subsets thereof, arranging predefined groups of such subsets, and allowing a customer to choose its wanted subset of data from the data comprised in the subsets in a group.

11. The method of claim 10, wherein the generated sets of data are stored according to templates individual to each predefined subset and defining the data which the subset contains, the data of a predefined subset or pointers to those data being stored in an individual data storing means for each such subset.

12. The method of claim 11, wherein a union template is created for each group of subsets, the union template being a union of definitions in the templates of the subsets in the group.

13. The method of claim 10, applied in an electronic, computer based telecommunication system comprising an object oriented processor system which data are exchanged between data bases and different customers connected thereto, wherein each of the predefined subsets belongs to a respective one of a number of particular services and comprises all information related to the service.

14. The method of claim 13, wherein service objects are arranged, each service object defining data information which is included in a service,
a common object is arranged, which is associated with service objects and comprises definitions based on information in these service objects, to create a definition of the possible data which can be allowed to be delivered to a customer, by uniting only the definitions in all associated service objects to a union.

15. A data handling system, where sets of data for repeated transactions are generated, and different customers connected to the system want different subsets of the generated data, comprising:
a separate memory area arranged for each customer,
first extraction means for extracting, when a set of data is generated, only those data which belong to at least one of the subsets of data wanted by the different customers, and storing all these extracted data in each separate memory area arranged for the different customers,
second extraction means for extracting from such a separate memory area for a customer only those data belonging to the subset of data wanted by the customer.

16. The system of claim 15, further comprising memory means for storing a common template comprising a union of only definitions of the subsets of data wanted by the customers.

17. The system of claim 15, further comprising memory means for storing a template for defining a subset of data wanted by a customer.

18. In an electronic, computer based telecommunication system, as claimed in claim 15, comprising an object oriented processor system, by which data are exchanged between data bases and customers connected thereto, a device for extracting, from a data base commonly created for the customers, exactly a particular information which an individual customer wants to have delivered, comprising:
a data storing means intended for one of a number of particular services and containing all information related to the service, the data storing means comprising a memory in which all the data related to the particular service are continuously stored and read, wherein
the first extraction means creates one data record from the information stored in the data storing means, the data record being common to all connected customers and containing only information which is needed by the customers, and
the second extraction means then being arranged, so that exactly those data which are based on desires of the respective customer are extracted from the common data record to each one of the customers.

19. The device of claim 18, further comprising a first unit comprising a first memory area for storing a first object comprising information defining the service.

20. The device of claim 19, wherein the first unit comprises second memory areas, one for each customer and for storing the second object associated with the customer and comprising definitions of the data which the respective customer wants to extract from the common data record.

21. The device of claim 20, wherein the first unit comprises a third memory area for storing a third object, associated with the first and second memory areas.

22. The device of claim 21, further comprising a second unit arranged to, during current handling of the service, write data necessary to the service in the data storing means and, after finished handling of the service, to provide to the first unit a packing command signal.

23. The device of claim 22, wherein the first unit is arranged, when receiving the packing command signal, to use the definitions in the third object associated with the service, for forming the common data record.

24. The device of claim 21, wherein the third object is arranged to read, when one of the second objects associated therewith is changed, all the second objects associated with the third object, and form a union of the definitions of data as specified in these second objects.

25. The device of claim 18, further comprising:
separate memory means for each customer included in the second extraction means, and
distribution means for forwarding a copy of the common data record to each one of separate memory means belonging to the respective customer.

26. The device of claim 25, further comprising
a data processing unit individually connectable to each customer and also included in the second extraction means,
the separate memory means for a customer being arranged, on receiving a signal issued by the customer requesting to have its individual data delivered, to deliver the whole current data record stored therein to the data processing unit which is arranged, after a comparison between the information in the received common data record and the information in the second object belonging to the customer, to deliver the desired individual information to the customer.

27. The device of claim 26, wherein the data processing unit comprises a register and a comparator circuit, and is arranged, at a signal issued when a customer, with which the data processing unit is connectable, wants to have data delivered, to activate the comparator circuit to compare the information as delivered from the separate memory means belonging to the customer and the second object of this customer and to store, depending on the result of the comparison, the corresponding data in the register, and to deliver the data to the customer from the register.

28. The device of claim 18, wherein the telecommunication system is a telephone system by which connected subscribers exchange telephone calls, the data generated being all information relating to calls stored in the data storing means intended therefore and data included in a service, stored in the data storing means, in particular for service debiting, are constituted by debiting data generated during a telephone call, such data in particular comprising telephone numbers of called and calling telephone sets, start time of the call, end time, duration, debitable time, date.

29. The device of claim 18, wherein a separate data storing means is arranged for each particular service.

30. The device of claim 25, wherein the separate memory means, which are arranged for a customer, are arranged to store a number of different common data records common to the customers, in particular one common data record per each telephone call made in the telecommunication system.

31. A data handling system, where sets of data for repeated transactions are generated, and different customers connected to the system are allowed to have delivered thereto different subsets of the generated data, comprising:

extraction means for extracting from each generated set of data predefined subsets thereof, data storage means for storing one of the data of each extracted subset and pointers to those data, one separate data storage means being arranged for each extracted subset, predefined groups of such subsets extracted from one generated set of data being arranged, a customer being allowed to choose its wanted subset of data from the data comprised in the subsets in a group.

32. The system of claim 31, further comprising memory means for storing templates individual to each predefined subset and defining the data which the subset contains, one of the data of a predefined subset and pointers to those data being stored in an individual data storing means for each such subset.

33. The system of claim 32, further comprising memory means for storing a union template for each group of subsets, the union template being a union of definitions in the templates of the subsets in the group.

34. The system of claim 31, as applied in an electronic, computer based telecommunication system comprising an object oriented processor system by which data are exchanged between data bases and customers connected thereto, wherein the predefined subsets each belong to a respective one of a number of particular services and comprise all information in relation with the service, memory means are arranged for storing service objects, each service object defining the data information which is included in a service, and memory means are arranged for storing a common object, which is associated with service objects and comprises definitions based on information in these service objects, the common object comprising a definition of the possible data which can be allowed to be delivered to a customer and being created by uniting only the definitions in all the associated service objects to a union.

35. The method of claim 1, further comprising a step of determining what subsets of data are wanted by different customers, before the data is generated.

36. The system of claim 15, wherein said different customers define wanted subsets of data, before the data is generated.

37. The method of claim 1, further comprising the steps of:

performing the repeated transactions; and for each transaction, generating data pertinent to the transaction.

38. The method of claim 10, further comprising the steps of:

performing the repeated transactions; and for each transaction, generating data pertinent to the transaction.

39. The system of claim 15, wherein the repeated transactions are performed, and, for each transaction, data is generated pertinent to the transaction.

40. The system of claim 31, wherein the repeated transactions are performed, and, for each transaction, data is generated pertinent to the transaction.

* * * * *